G. J. CAPEWELL.

Nail Extractors.

No. 5,502. Reissued July 29, 1873.

Witnesses:

H. L. Mattenberg.

M. Lovell

Inventor:

George J. Capewell per

Atty

THE NORRIS PETERS CO., WASHINGTON, D. C.

UNITED STATES PATENT OFFICE.

GEORGE J. CAPEWELL, OF CHESHIRE, CONNECTICUT.

IMPROVEMENT IN NAIL-EXTRACTORS.

Specification forming part of Letters Patent No. 129,210, dated July 16, 1872; reissue No. 5,502, dated July 29, 1873; application filed March 14, 1873

*To all whom it may concern:*

Be it known that I, GEORGE J. CAPEWELL, of Cheshire, in the county of New Haven and State of Connecticut, have invented a new and Improved Nail-Extractor; and that the following is a full, clear, and exact description of the same, reference being had to the accompanying drawings and to the letters of reference marked thereon making a part of this specification:

This invention has for its object the construction of an instrument for extracting nails; and the invention consists in making a nail-extractor that will draw a nail, though the head of the nail is below the surface of the wood into which it is driven; and the invention also consists in constructing a nail-extractor to operate in such manner that the act of drawing the nail will not materially bend the nail.

Figure 1:
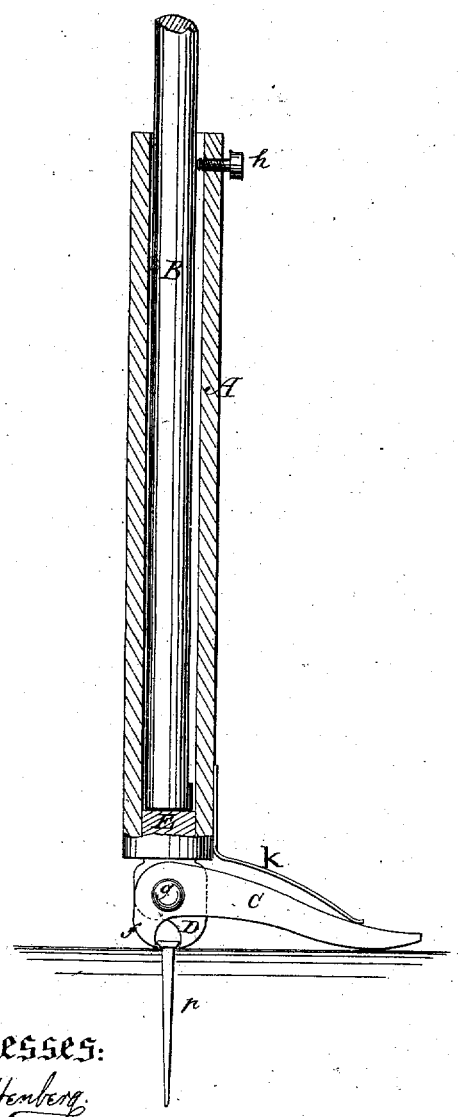
Figure 2:
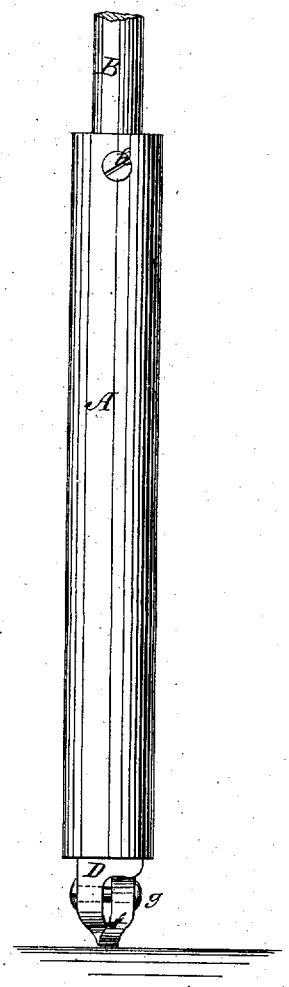

In the accompanying sheet of drawings, Figure 1 represents a nail-extractor partly in section, and Fig. 2, a back view of same.

Similar letters of reference indicate like parts in the several figures.

A represents a hollow cylindrical stem or lever, which may be made of gas-pipe or other similar material. Firmly screwed or otherwise secured to the lower end of the stem A is a plug of steel, E, tightly closing the end of the stem. The lower part of this plug, or that which projects below the end of the stem A, is flattened out and curved, forming a sharp-pointed claw, D. (See Fig. 1.) Affixed to the claw D, by a rivet, *g*, is a second claw, *f*, of steel, of like shape as the claw D, the claw *f*, however, extending on one side into a curved fulcrum, C, and by the action of a spring, *k*, said fulcrum and claw *f* at all times maintain their normal position. Loosely fitting into the cylindrical stem or lever A is a solid cylindrical rod or rammer, B, which is kept in position within the stem A by a rabbet on one side, into which enters a screw, *h*, by means of which said rammer cannot be entirely withdrawn from the cylindrical stem or lever A.

The instrument being constructed as above described, its operation is as follows: It is held perpendicularly immediately over the head of a nail, *p*, as shown in Fig. 1. The rammer B is then drawn out and "rammed" down with force once or twice against the plug E. This operation forces the points of the claws D and *f* into the wood, and allows the claws to come in immediate contact with the nail-head. The cylindrical stem or lever A is then grasped and bent over in the direction of the fulcrum C, and the nail is withdrawn without injuring the wood that contained it. As the lever or stem A is bent over the fulcrum C yields slightly around the rivet *g*, which allows the claw *f* to accommodate itself to the change of direction from a right line to a curve, and the nail is therefore withdrawn from the wood in straight condition, and ready to be driven again, if desired.

From the foregoing it will be seen that the nail will not only be drawn unbent and uninjured, but the nail may be drawn with equal facility even if its head is countersunk or punched below the surface of the wood into which it is driven, and the box, &c., remain uninjured.

What I do claim as new, and desire to secure by Letters Patent, is—

A nail-extractor, provided with a movable jaw and fulcrum, in combination with a percussive device, constructed and operating substantially as shown and described.

GEORGE J. CAPEWELL.

Witnesses:
EDMUND B. BENHAM,
EDWARD A. CORNWALL.